US 8,595,329 B2

(12) United States Patent
Kleinfelter et al.

(10) Patent No.: US 8,595,329 B2
(45) Date of Patent: *Nov. 26, 2013

(54) REDUCING DNS LOOKUPS

(75) Inventors: Kevin P. Kleinfelter, Atlanta, GA (US); Kim Littrell, Marietta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 181 days.

This patent is subject to a terminal disclaimer.

(21) Appl. No.: 13/213,131

(22) Filed: Aug. 19, 2011

(65) Prior Publication Data
US 2012/0036227 A1    Feb. 9, 2012

Related U.S. Application Data

(62) Division of application No. 10/183,638, filed on Jun. 28, 2002, now Pat. No. 8,028,091.

(51) Int. Cl.
*G06F 15/16* (2006.01)

(52) U.S. Cl.
USPC ........... 709/219; 709/245; 709/223; 709/220; 709/208; 709/204

(58) Field of Classification Search
USPC .......................... 709/219, 245, 223, 220, 208
See application file for complete search history.

(56) References Cited

U.S. PATENT DOCUMENTS

| | | | |
|---|---|---|---|
| 6,304,578 B1 | 10/2001 | Fluss | |
| 6,442,602 B1 | 8/2002 | Choudhry | |
| 6,598,051 B1 | 7/2003 | Wiener et al. | |
| 6,725,227 B1 | 4/2004 | Li | |
| 6,862,607 B1 | 3/2005 | Vermeulen | |
| 7,003,555 B1 | 2/2006 | Jungck | |
| 7,082,476 B1* | 7/2006 | Cohen et al. | 709/246 |
| 7,143,193 B1 | 11/2006 | Abbott et al. | |
| 2002/0099591 A1 | 7/2002 | Dyer | |
| 2002/0101836 A1 | 8/2002 | Dorenbosch | |
| 2002/0156836 A1 | 10/2002 | Janosik et al. | |
| 2003/0009457 A1 | 1/2003 | Lu | |
| 2003/0172183 A1 | 9/2003 | Anderson et al. | |
| 2004/0039798 A1 | 2/2004 | Hotz et al. | |
| 2006/0218242 A1* | 9/2006 | Tock et al. | 709/217 |
| 2007/0073806 A1 | 3/2007 | Srinivas et al. | |
| 2009/0013083 A9 | 1/2009 | Garcia-Luna-Aceves et al. | |
| 2009/0077602 A1 | 3/2009 | O'Neil | |

* cited by examiner

*Primary Examiner* — Lan-Dai T Truong
(74) *Attorney, Agent, or Firm* — Scott P. Zimmerman, PLLC

(57) ABSTRACT

A method for reducing Domain Name System (DNS) lookup traffic in a computer data network in a system including a router in communication with a client computer includes the steps of receiving a DNS lookup request through a web browser when the user requests to open a particular URL. The router sends the DNS lookup request for a hostname of the web server to a DNS server and receives a corresponding IP address. The router forwards the IP address to the web browser and the web browser sends a network connection request with a file transfer request to the router. The router forwards the request to the web server. The web server responds to the request by sending an HTML document for the web page. Upon receiving the HTML document, the router examines the HTML document for the URLs associated with image elements to be downloaded for display of a web page and sends one DNS lookup request for each of the distinct hostnames, regardless of how many times that distinct hostname appears in the HTML document. The router receives IP addresses, each of which corresponds to one of each of the distinct hostnames and modifies the HTML document by replacing the each of the distinct hostnames, including their recurrences, in the URLs associated with the image elements with their corresponding IP addresses.

18 Claims, 3 Drawing Sheets

REDUCING DNS LOOKUPS

CROSS-REFERENCE TO RELATED APPLICATIONS

This application is a continuation of U.S. application Ser. No. 10/183,638, filed Jun. 28, 2002, 2010, and now issued as U.S. Pat. No. 8,028,091, and incorporated herein by reference in its entirety.

The present invention relates generally to the field of computer data networks, and more particularly to the reduction of Domain Name System (DNS) lookup traffic in a computer data network.

BACKGROUND OF THE INVENTION

As known in the art, computers connected to the Internet use the well-known transmission control protocol/internet protocol (TCP/IP) to negotiate the network communications with other computers on the network. TCP/IP network packets are transmitted to other computers using an IP address to identify the source and destination computers. An IP address is currently defined as a 32-bit number which is generally expressed as four octets (converted to their decimal values) separated by a period, for example, 12.34.56.78. Due to the very large number of computers connected to the Internet, it would not be convenient for the users to memorize the IP address assigned to each of the computers being accessed. Accordingly, a Domain Name System (DNS) was implemented whereby a computer may be identified by a mnemonic host name, such as www.whitehouse.gov.

DNS is a name resolution method that allows the users and applications to initiate network communications with a hostname, without an IP address, for other computers on the network. The DNS server maintains a database of hostnames and their corresponding IP addresses. The users can open a web page on his or her web browser by directing the application to connect to a particular universal resource location (URL) which identifies the web server and the particular document to be downloaded to the browser. When the sending computer or application needs to open a network connection to another computer, it first contacts a DNS server to resolve the other computer's hostname to its IP address. DNS servers are distributed throughout the Internet. DNS servers communicate with other DNS servers to resolve a network address.

The standard convention for a URL is 'protocol://host's name/name of file.' The protocol includes, for example, FTP (file transfer protocol), telnet and HTTP (hypertext transfer protocol). Typically, HTTP is used to transfer information (also referred to as "content") from a web server application for display by web browser (a web client computer application). HTTP is the set of rules for exchanging files, for example, text, graphic images, sound, and video, in the Internet. Content is generally organized into groups of data, referred to as a "web page," defined in documents downloaded from the web server to the browser. The web page is a text file that contains text and a set of HTML (hyper text markup language) tags that describe how the text should be formatted when a browser displays the web page for the user.

A HTML tag is a code element that tells the web browser what to do with the text. Each tag appear as letters or words between a '<' and a '>.' For example, <HTML> tells the browser that this is the beginning of an HTML document and <TITLE> tells the browser that this is the title of the page. HTML defines a document format, for example, the page layout, fonts and image elements (graphic elements). Each of the tags defining an image element includes the location of the image element, for example, <img src="URL"> or <img src="name of the file">. The HTML document also has ability to link text and/or an image to another document or section of a document. Each link contains the URL of a web page residing on the same server or any server in the interne, for example, <a href="URL">. The web browser interprets the set of HTML tags within the HTML document and displays for the user.

FIG. 1 is a schematic diagram of web page 100 as it may be displayed on a client computer. Web page 100 may include a plurality of textual information, represented by text displays 102 and 104 in FIG. 1. Web page 100 may also include image elements 106, 108, 110 and 112. These image elements are displayed on the web page via instructions to download image elements from a URL in an HTML document. For example, URL 116 is associated with image element 106 as shown in FIG. 1. Similarly, URLs 118, 120 and 122 are associated with image elements 108, 110 and 112, respectively. Each image element is independently downloaded. The URLs are shown in FIG. 1 with a dashed outline to indicate that the actual URL is not typically displayed on the web browser, while the image elements specified by the URLs are displayed.

FIG. 2 is a schematic diagram showing a basic architecture used to provide web-based services. This architecture includes client computer 200 and server 202. Client computer 200 can include a processor 204 coupled via bus 206 to network port 208, and memory 210. Client computer 200 can communicate with server 202 via network 212. Server 202 can include a processor 214 coupled via bus 216 to network port 218, and memory 220. One or more routers may be used within network 212 to direct network packets to their destination. Router 222 is one such router. The function and operation of conventional IP routers are well-known in the art. For example, router 222 receives network packets from client computer 200. For each of the network packets, the router determines the best available route, using one or more routing tables, and sends the packets to their destination via the best available route.

FIG. 3 is a flow diagram showing steps used in conventional web-based systems to download a web page. In step 300, the web browser receives a user's request to open a particular URL. In step 302, the web browser sends a request for name resolution to router 222 (shown in FIG. 2) and the router forwards the request to a DNS server. In step 304, the DNS server responds to the request and the web browser receives the IP address assigned to the web server. In step 306, the web browser opens a network connection with the IP address supplied by the DNS server and sends an HTTP request to the web server, asking for the file. In step 308, the web server responds to the request and the web browser receives an HTML document for the web page from the web server. Once the HTML document has been downloaded, the web browser closes the network connection in step 310

Next, in step 312, the web browser examines the HTML document and determines whether or not there are additional image elements to be downloaded for display within the web page. If there are no additional image elements to be downloaded for display, the process ends. Otherwise, in step 314, the web browser requests name resolution for the web server's hostname indicated in the URL associated with the image element. This URL is indicated within the HTML document downloaded in step 308. The DNS server responds to the DNS lookup request by providing the IP address corresponding to the web server's hostname. In step 316, the web browser receives the IP address assigned to the web server. In step 318, the web browser opens a network connection using the IP address supplied by the DNS server. In step 320, the web browser downloads the image element specified in the user's URL request. Once the image element has been downloaded, the web browser closes the network connection in step 322. The process repeats steps 312-322 until all image elements identified in the HTML document have been downloaded.

As can be seen from the steps shown in FIG. 3, the web browser may make numerous DNS lookup requests each time a single web page is downloaded, even though the web page typically references image elements that are stored on the same web server host as the web page. The repeated DNS lookup operations generally requests name resolution for the same host in numerous succession just to render a single web page. If an HTML document (web document) for a web page includes, for example, ten different image elements, the web browser will perform a total of eleven DNS lookup operations (one to download the HTML document and one operation for each image element), even if the DNS lookup operations are requesting name resolution for the same host. As web content developers continue to increase the complexity of web pages, the number of image elements within a particular web document may become very large. Accordingly, the load on DNS servers has increased. The load on DNS server 224 is furthermore increased due to the multiple requests for the same information. Not only can the DNS server itself be impaired due to the increased load, but the network traffic across network 212 is increased with each DNS lookup request resulting in poorer performance across the network.

A need therefore exists for systems and methods of reducing requests for name resolution for web-based services.

SUMMARY OF THE INVENTION

The present invention is related to a system and method for reducing DNS lookup traffic in a computer data network.

In an embodiment of the present invention, a method for reducing Domain Name System (DNS) lookup traffic in a computer data network in a system including a router in communication with a client computer includes the steps of receiving a DNS lookup request through a web browser when the user requests to open a particular URL. The router sends the DNS lookup request for a hostname of the web server to a DNS server and receives a corresponding IP address. The router forwards the IP address to the web browser and the web browser sends a network connection request with a file transfer request to the router. The router forwards the request to the web server. The web server responds to the request by sending an HTML document for the web page. Upon receiving the HTML document, the router examines the HTML document for the URLs associated with image elements to be downloaded for display of a web page and sends one DNS lookup request for each of the distinct hostnames, regardless of how many times that distinct hostname appears in the HTML document. The router receives IP addresses, each of which corresponds to one of each of the distinct hostnames and modifies the HTML document by replacing the each of the distinct hostnames, including their recurrences, in the URLs associated with the image elements with their corresponding IP addresses.

DETAILED DESCRIPTION OF THE INVENTION

Reference will now be made in detail to the preferred embodiments of the present invention, examples of which are illustrated in the accompanying drawings.

Figure 1:
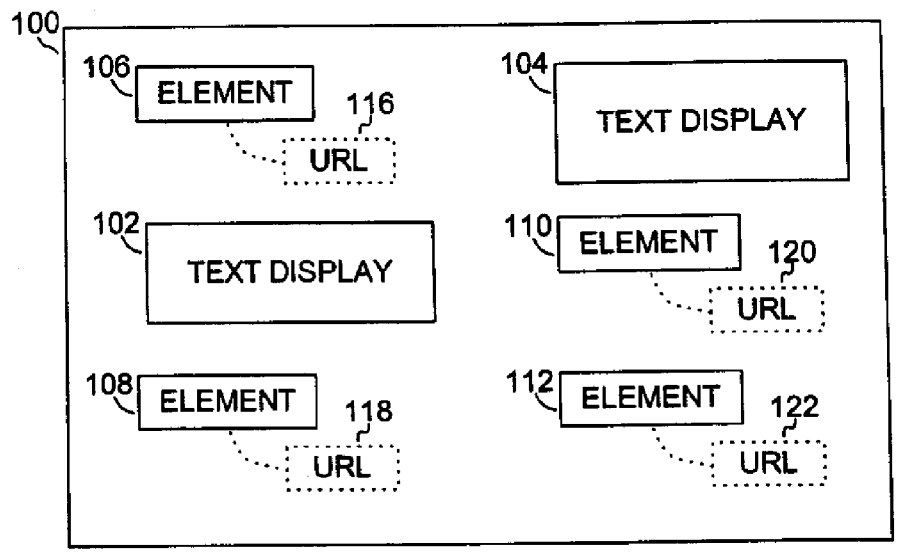
FIG. 1 is a schematic diagram showing a typical web page.
Figure 2:
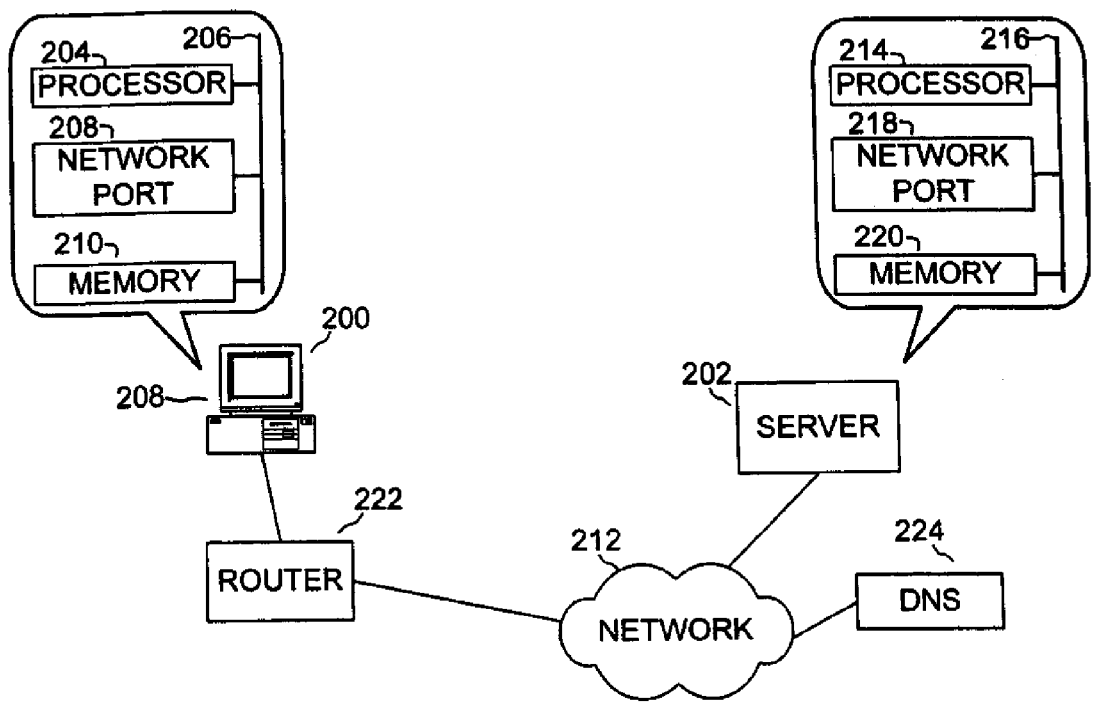
FIG. 2 is a schematic diagram showing a typical architecture used to provide web-based services.
Figure 3:
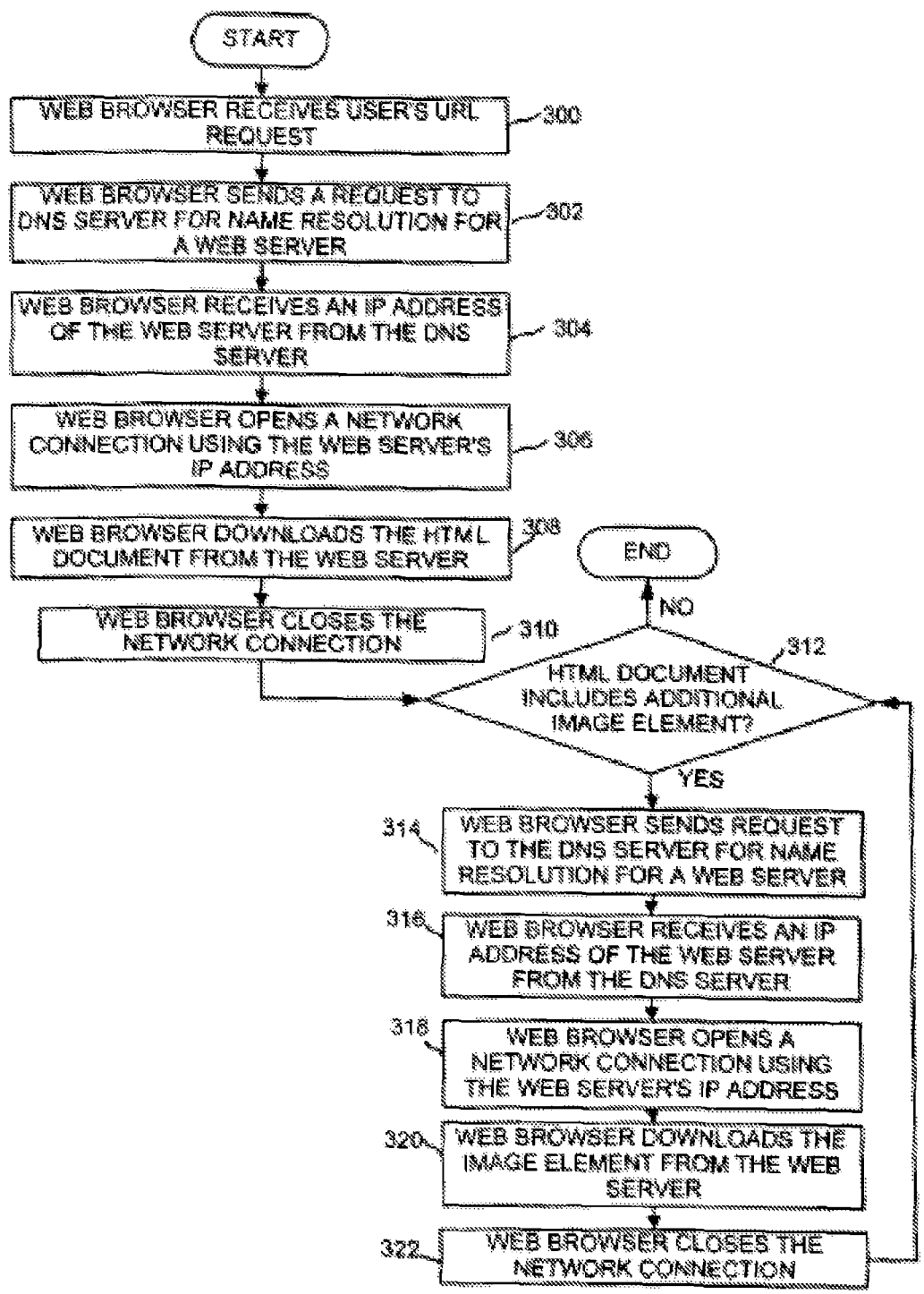
FIG. 3 is a flow diagram showing steps used in conventional web-based systems to download a web document.
Figure 4:
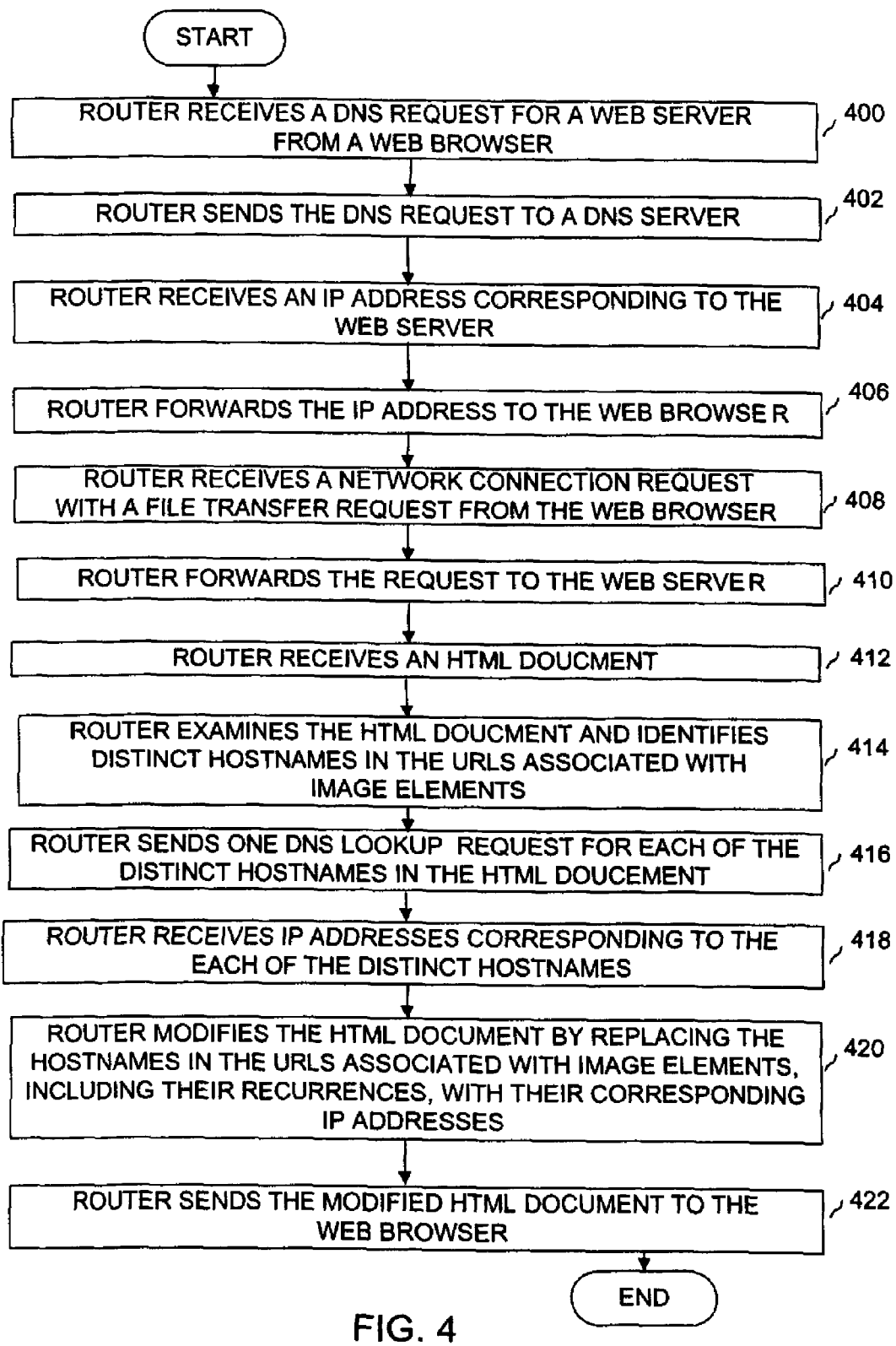
FIG. 4 is a flow diagram showing the steps that may be performed to reduce DNS lookup traffic in a computer data network according to a preferred embodiment of the present invention.

FIG. 4 is a flow diagram showing the steps that may be used for reducing DNS lookup traffic in a network according to a preferred embodiment of the present invention. As an example, an architecture used to provide web-based services shown in FIG. 2 is referenced. In step 400, router 222 receives a request for name resolution through a web browser, when the user requests a network connection to a particular URL. Router 222 receives the DNS lookup request including a hostname of the web server identified in the URL. In step 402, router 222 sends the DNS lookup request to DNS server 224. In step 404, DNS server 224 responds to the request, and router 222 receives the information including an IP address corresponding to the hostname of the web server from the DNS server. In step 406, router 222 forwards the IP address to the web browser. Upon receiving the IP address of the web server, the web browser sends a network connection request. In step 408, router 222 receives the network connection request with a file transfer request, for example an HTTP request, from the web browser. In step 410, router 222 forwards the request to the web server. The web server responds to the request and router 222 receives an HTML document from the web server in step 412.

In step 414, router 222 examines the received HTML document for the URLs associated with image elements to be downloaded for display of a web page. In step 415, router 222 identifies distinct hostnames in the URLs associated with the image elements to be downloaded. In step 416, router 222 sends one DNS lookup request for each of the distinct hostnames, regardless of how many times that distinct hostname appears in the HTML document. For example, if an HTML document includes three URLs associated with image elements with the same hostname, instead of requesting a DNS lookup three times, router 222 requests only one DNS lookup.

In step 418, the DNS server responds to the DNS lookup requests and router 222 receives IP addresses, each of which corresponds to one of each of the distinct hostnames. In step 420, upon receiving the IP addresses, router 222 modifies the HTML document by replacing the each of the distinct hostnames, including their recurrences, in the URLs associated with the image elements with their corresponding IP addresses.

For example, an HTML document may include the following:

<img src="www.abc.com/file1">
<img src="www.abc.com/file2">
<img src="www.abc.com/file3">
<img src="www.xyz.com/file1">
<frame src="www.lmn.com/file1">
<img src="www.lmn.com/file2">

Upon receiving the HTML document, router 222 examines the HTML document and sends three DNS lookup requests, one for each of abc.com, xyz.com and lmn.com. Upon receiving their corresponding IP addresses, router 222 modifies the HTML document as follows:

```
<img src="111.2.3.1 /file1">
<img src="111.2.3.1/file2">
<img src="111.2.3.1/file3">
<img src="333.4.5.2/file1">
<frame src="55.55.55.5/file1">
<img src="55.55.55.5/file2">
``` where 111.2.3.1 corresponds to abc.com, 333.4.5.2 corresponds to xyz.com and 55.55.55.5 corresponds to lmn.com.

Next, in step 422, router 222 sends the modified HTML document to the web browser. The HTML document received by the web browser has the IP addresses of the web servers, rather than the hostnames, in the URLs associated with image elements. The web browser can download the image elements without requesting DNS lookup.

In the present invention, a router intercepts the incoming HTML document and rewrites the HTML document before sending it to a web browser. The router examines the HTML document and requests one DNS lookup request for each of the distinct hostnames in the URLs associated with image elements. Upon receiving IP addresses, each of which corresponds to the each of the distinct hostnames, the router modifies the HTML document by replacing the distinct hostnames, including their recurrences, in the URLs associated with image elements with their corresponding IP addresses. The router provides the web browser with the modified HTML document containing the IP addresses of the web servers, rather than the hostnames, in the URLs associated with image elements. The web browser can open network connections to the web servers to download the image elements in a web page without requesting a DNS lookup. In this specification and claims, the term "image element" is used as an example of the files to be downloaded for display of a web page.

Accordingly, in the present invention, the router prevents the web browser from sending multiple DNS lookup requests for the same hostname. Thus, the number of DNS lookup request being sent to a DNS server can be reduced. Furthermore, network traffic can be reduced as well as the load on the DNS server.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method, comprising:
receiving an initial request from a client requesting a hypertext markup language file;
sending a request for the hypertext markup language file to a web server;
intercepting the hypertext markup language file before sending the hypertext markup language file to the client;
identifying distinct hostnames in universal resource locations associated with elements in the hypertext markup language file to be downloaded for display of a web page;
when multiple universal resource locations all correspond to a distinct hostname, then sending only one domain name server lookup request to a domain name server for the multiple universal resource locations;
receiving an Internet Protocol address that corresponds to the distinct hostname in response to the domain name server lookup request;
creating a modified hypertext markup language file by replacing each occurrence of the distinct hostname in the hypertext markup language file with the Internet Protocol address; and
forwarding the modified hypertext markup language file to the client in response to the initial request, the modified hypertext markup language file having the distinct hostname replaced with the Internet Protocol address, such that the elements may be downloaded without requests to the domain name server.

2. The method according to claim 1, further comprising storing a database that associates hostnames to addresses.

3. The method according to claim 1, further comprising identifying the web server.

4. The method according to claim 1, further comprising determining other multiple universal resource locators containing a different hostname.

5. The method according to claim 4, further comprising replacing each occurrence of the different hostname with a different Internet Protocol address.

6. The method according to claim 5, further comprising sending another domain name server lookup request for the other multiple universal resource locators corresponding to the different hostname.

7. The method according to claim 6, further comprising receiving the different Internet Protocol address in response to the another domain name server lookup request.

8. The method according to claim 1, wherein the initial request is a domain name server request received from a web browser at the client.

9. The method according to claim 1, further comprising querying for the hypertext markup language file.

10. The method according to claim 1, further comprising receiving a web server Internet Protocol address that corresponds to the web server.

11. A system, comprising:
a processor;
memory; and
code stored in the memory that when executed causes the processor at least to:
receive an initial request from a client requesting a hypertext markup language file;
send a request for the hypertext markup language file to a web server;
intercept the hypertext markup language file before sending the hypertext markup language file to the client;
identify distinct hostnames in universal resource locations associated with elements in the hypertext markup language file to be downloaded for display of a web page;
when multiple universal resource locations all correspond to a distinct hostname, then send only one domain name server lookup request to a domain name server for the multiple universal resource locations;

receive an Internet Protocol address that corresponds to the distinct hostname in response to the domain name server lookup request;

create a modified hypertext markup language file by replacing each occurrence of the distinct hostname in the hypertext markup language file with the Internet Protocol address; and forward the modified hypertext markup language file to the client in response to the initial request, the modified hypertext markup language file having the distinct hostname replaced with the Internet Protocol address, such that the elements may be downloaded without requests to the domain name server.

12. The system according to claim 11, further comprising code that causes the processor to determine the hypertext markup language file contains other multiple universal resource locators containing a different hostname.

13. The system according to claim 12, further comprising code that causes the processor to retrieve a different Internet Protocol address associated with the different hostname.

14. The system according to claim 12, further comprising code that causes the processor to send another domain name server lookup request for a different Internet Protocol address corresponding to the different hostname.

15. The system according to claim 14, further comprising code that causes the processor to replace each occurrence of the different hostname with the different Internet Protocol address.

16. A computer readable memory storing processor executable code for performing a method, the method comprising:

receiving an initial request from a client requesting a hypertext markup language file;

intercepting the hypertext markup language file before sending the hypertext markup language file in response to the initial request of the client;

identifying distinct hostnames in universal resource locations associated with elements in the hypertext markup language file to be downloaded for display of a web page;

when multiple universal resource locations all correspond to a distinct hostname, then sending only one domain name server lookup request to a domain name server for the multiple universal resource locations;

receiving an Internet Protocol address that corresponds to the distinct hostname in response to the domain name server lookup request;

creating a modified hypertext markup language file by replacing each occurrence of the distinct hostname in the hypertext markup language file with the Internet Protocol address; and sending the modified hypertext markup language file to the client in response to the initial request, the modified hypertext markup language file having the distinct hostname replaced with the Internet Protocol address, such that the elements may be downloaded without requests to the domain name server.

17. The computer readable memory according to claim 16, further comprising code for associating the Internet Protocol address to the hostname.

18. The computer readable memory according to claim 16, further comprising code for sending a single domain name server lookup request for the multiple universal resource locators corresponding to the hostname.

* * * * *